Figure 5:
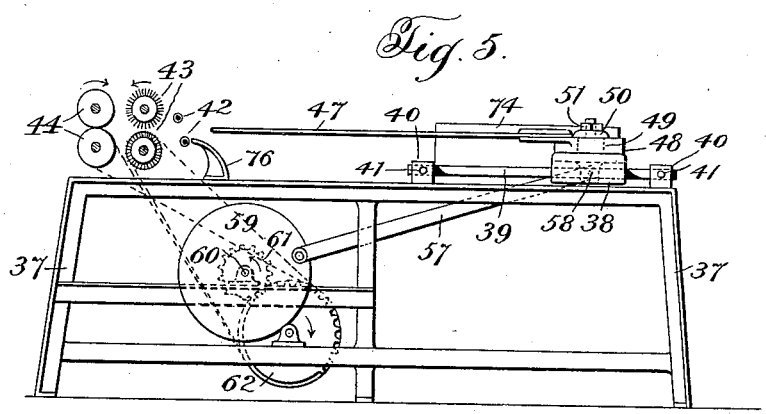

T. ALLSOP & W. W. SIBSON.
SINGEING MACHINE.
APPLICATION FILED MAR. 19, 1908.
930,116.
Patented Aug. 3, 1909.
5 SHEETS—SHEET 1.
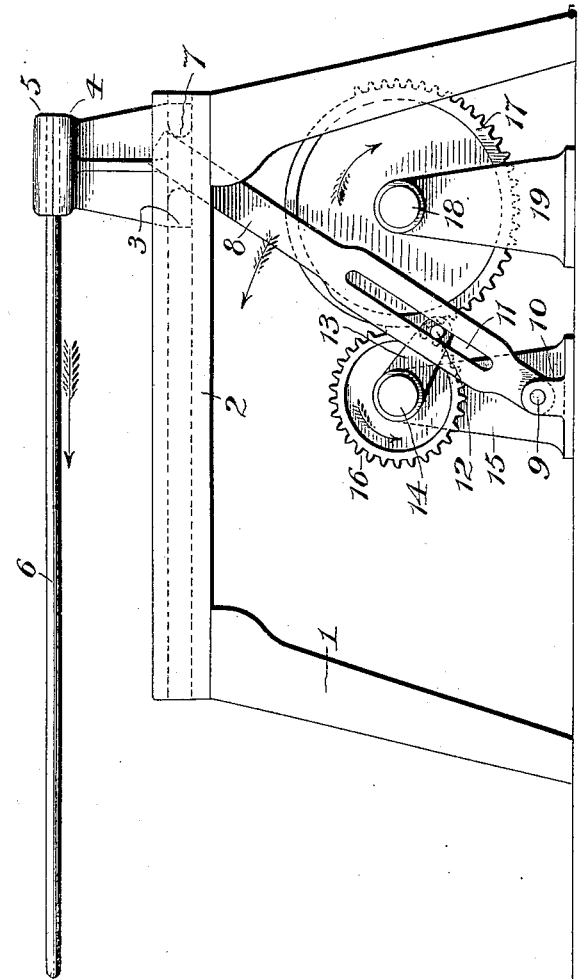
Fig. 1.
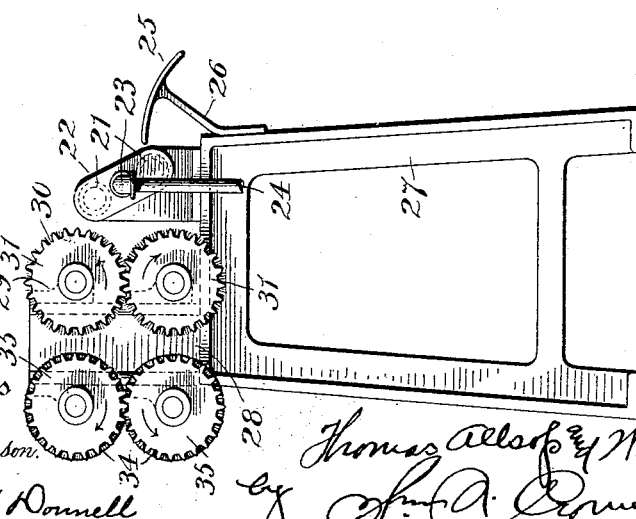

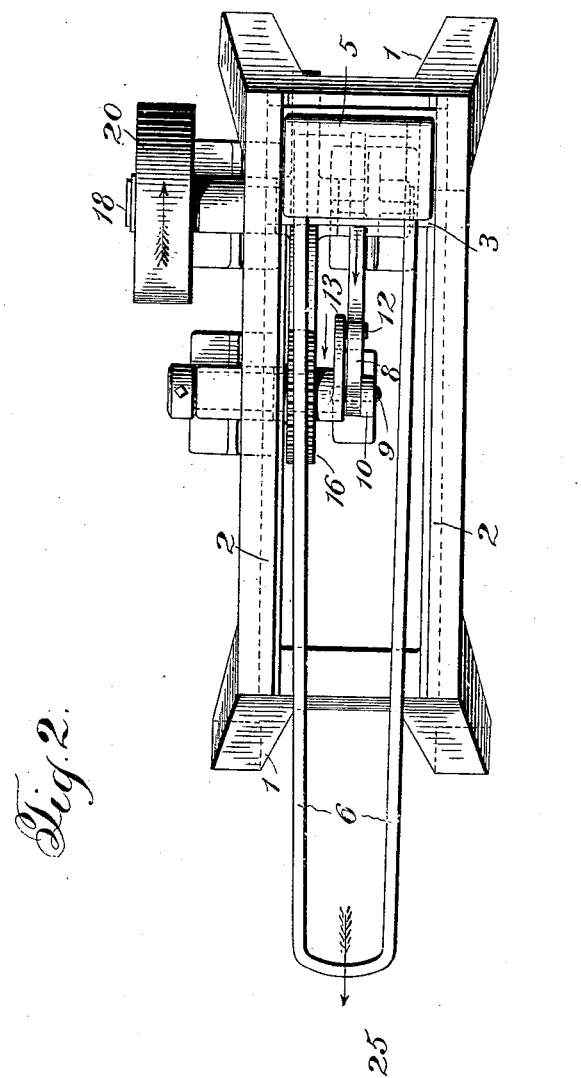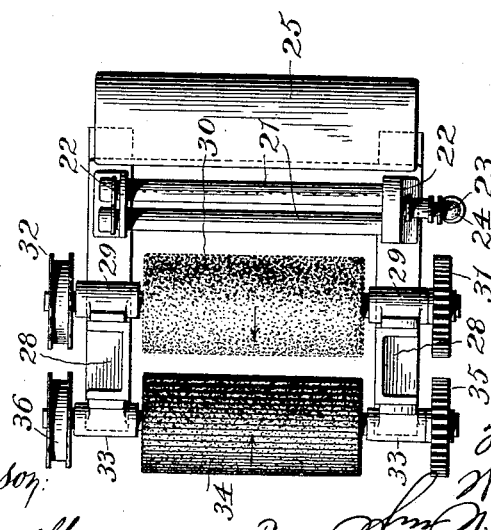

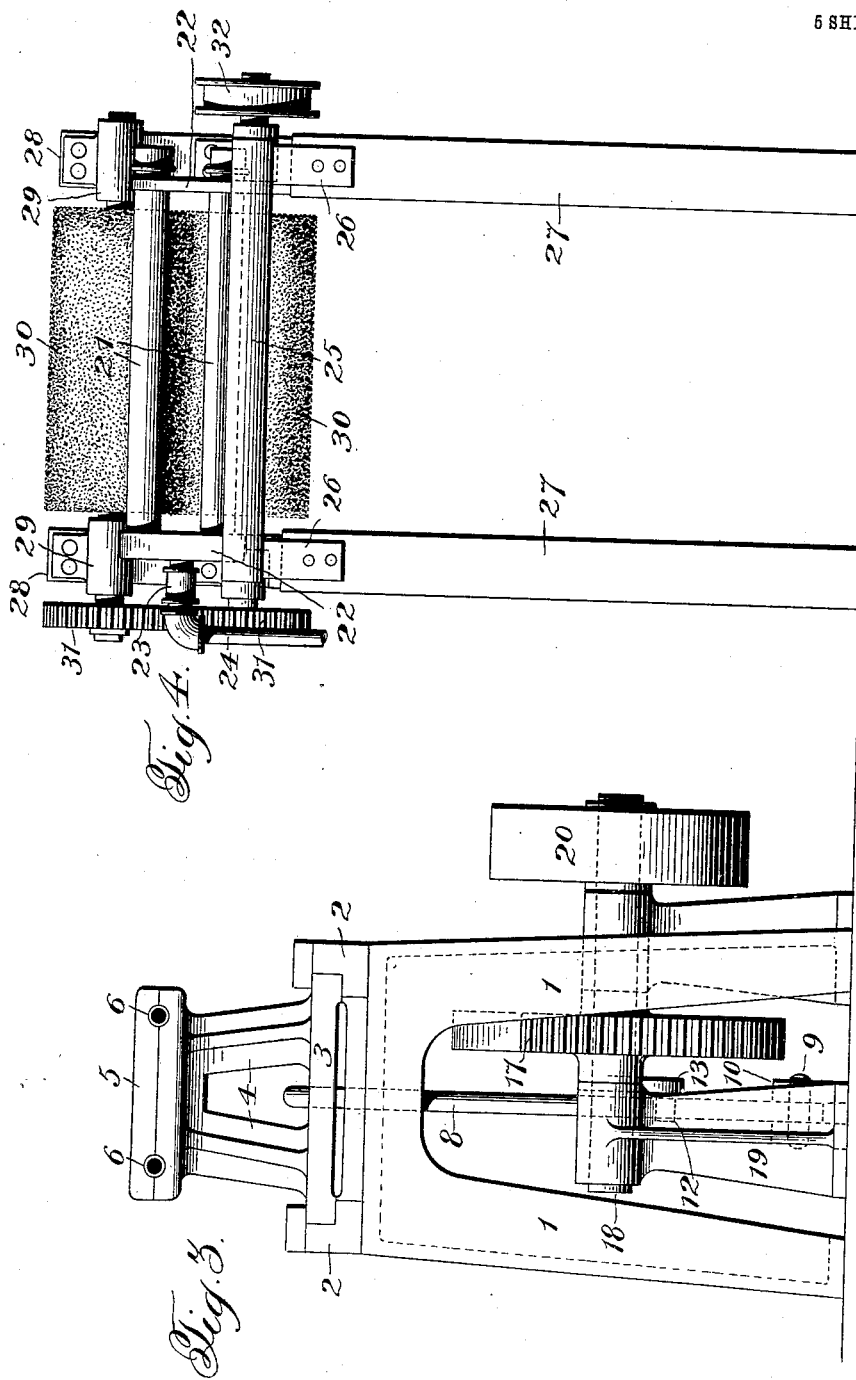

T. ALLSOP & W. W. SIBSON.
SINGEING MACHINE.
APPLICATION FILED MAR. 19, 1908.

930,116.

Patented Aug. 3, 1909.
5 SHEETS—SHEET 4.

T. ALLSOP & W. W. SIBSON.
SINGEING MACHINE.
APPLICATION FILED MAR. 19, 1908.
930,116.
Patented Aug. 3, 1909.
5 SHEETS—SHEET 5.
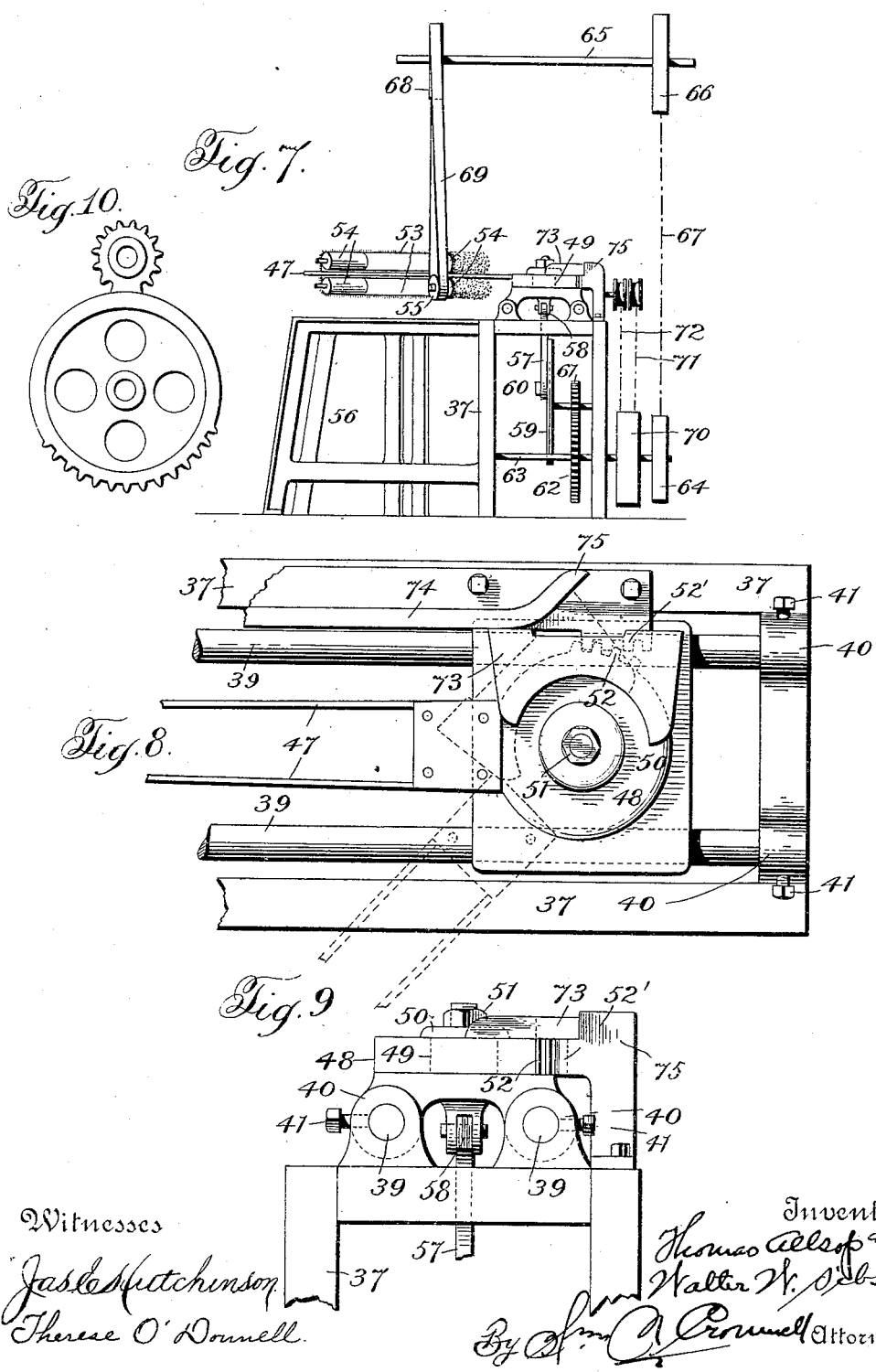

UNITED STATES PATENT OFFICE.

THOMAS ALLSOP AND WALTER W. SIBSON, OF PHILADELPHIA, PENNSYLVANIA, ASSIGNORS TO THE PHILADELPHIA DRYING MACHINERY COMPANY, OF PHILADELPHIA, PENNSYLVANIA, A CORPORATION OF PENNSYLVANIA.

SINGEING-MACHINE.

No. 930,116.  Specification of Letters Patent.  Patented Aug. 3, 1909.

Application filed March 19, 1908. Serial No. 422,020.

*To all whom it may concern:*

Be it known that we, THOMAS ALLSOP and WALTER W. SIBSON, citizens of the United States, residing at Philadelphia, in the county of Philadelphia and State of Pennsylvania, have invented certain new and useful Improvements in Singeing-Machines; and we do hereby declare the following to be a full, clear, and exact description of the invention, such as will enable others skilled in the art to which it appertains to make and use the same.

This invention relates to improvements in singeing machines, and is especially concerned with machines of this character designed for finishing stockings.

Singeing machines have been provided heretofore in which the stockings, during their transit through the machines, were supported by forms, usually boards. These forms, however, after being introduced to the machine, have had no fixed path of movement therethrough, and, furthermore, the forms have had no definite relation to the machine proper. Therefore, these machines are lacking in supporting forms as component elements thereof having definite operative relation to the other elements of the machine, so that in the use of these machines, it has been necessary to provide a supply of the board forms, separate and independent of the machines, in order that the stockings to be singed might be properly supported in their passage through the machines. Not only is this expensive, but the forms become lost, and in the rough handling to which the forms are subjected they become impaired, thereby necessitating from time to time replenishing the supply of forms.

The present invention contemplates the provision of a machine designed primarily to dispense with the use of boards as the supporting medium for the stockings by embodying in the machine a form that constitutes a component element of the structure thereof, and thus has a definite relation to the other elements of the machine, and to so arrange and associate the parts that in the operation of the machine this form shall have a fixed path of movement. This gives to the stocking supported by the form accuracy of feed to the respective mechanisms of the machine, maintaining the stocking in proper distended position for the effectual removal of the loose fiber, and overcomes the necessity for supplying a stock of forms independently of the machine.

Having this general object in view, and others that will appear as the nature of the improvements is better understood, the invention consists substantially in the novel construction, combination and arrangement of parts hereinafter fully described, illustrated in the accompanying drawings, and pointed out in the appended claims.

Figure 6:
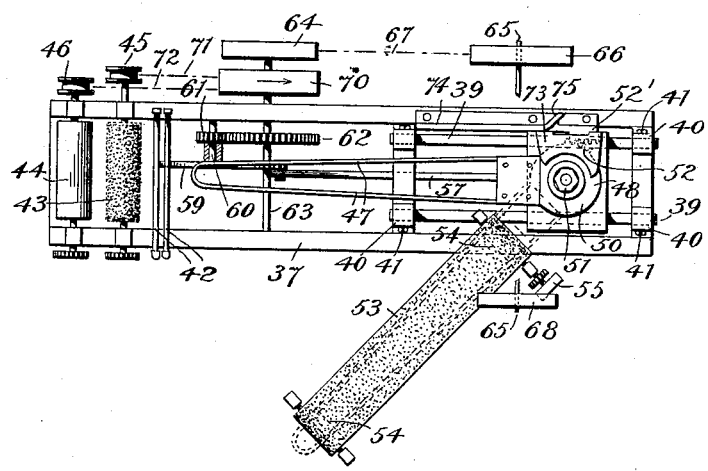

In the drawings, Figure 1 is a side elevation of a singeing machine constructed in accordance with the present invention. Fig. 2 is a top plan view thereof. Fig. 3 is an end view of the reciprocatory supporting form and adjuncts. Fig. 4 is a similar view of the singeing mechanism. Fig. 5 is a side elevation of another form of the machine. Fig. 6 is a top plan view thereof. Fig. 7 is an end view of the form illustrated in Figs. 5 and 6. Fig. 8 is a detail plan view, on an enlarged scale, of the stocking-supporting form, the shoe for guiding the same, and the guide for the shoe, as embodied in the machine of Figs. 5, 6 and 7. Fig. 9 is a rear end elevation of the construction disclosed in Fig. 8. Fig. 10 is an elevation illustrating the general construction of the mutilated gears employed for imparting to the stocking-supporting form intermittent reciprocatory movement.

Referring in detail to the drawings, the numeral 1 designates the supporting frame for the stocking-supporting form. This frame may be of any approved construction, but is preferably elongated that the stocking-supporting form may have the required range of movement, and to the accomplishment of the latter end the frame 1 is provided at its top portion with a pair of oppositely-arranged parallel longitudinally-extending guides 2. These guides open at the inner side of the frame 1, and mounted to reciprocate therein is a cross head 3. The cross head 3 has a pair of vertically-extending standards 4 at the top of which is provided a sectional clamping head 5, and this clamping head serves to rigidly hold upon the cross head 3 an elongated skeleton supporting form 6 upon which the stockings to be singed are placed. The form 6 may be formed of stout wire, or its equivalent, or if desired the same may be hollow in order to permit the introduction and circulation therethrough of a cooling medium, such as water. In this event the temperature of the form 6 would be maintained sufficiently low to prevent undue heating by passage of the form through the singeing flames, and to feed the form with the required cooling medium a hose or other flexible connection might be connected thereto in any approved manner. The tubular character of the form 6 is clearly disclosed in Fig. 3.

That the cross-head 3 may be reciprocated in the guides 2 the same is provided with a centrally-disposed aperture 7, said aperture receiving the upper end of an oscillatory bar 8 that is pivoted at 9 to a suitable support 10, and said bar 8 is provided adjacent its lower end with an elongated slot 11 that receives a pin or stud 12 carried by a crank 13. The crank 13 is mounted upon a shaft 14 journaled in the upper end of a bearing standard 15, the latter being carried by the support 10, and said shaft has also mounted thereon a pinion 16 that meshes with a mutilated gear 17. This mutilated gear 17 bears such a relation to the pinion 16 that one-half revolution of the gear 17 causes a complete revolution of the pinion 16, to which end only one-half of the perimeter of the gear 17 is provided with gear teeth. Thus it will be seen that while the gear 17 continuously rotates the rotation of the pinion 16 is intermittent, and during the engagement of the teeth of the gear 17 with said pinion 16 the operation of the latter causes the cross head 3 to move the entire length of the guides 2 and back again, at which time the cross head 3 comes to rest and remains there while the untoothed portion of the perimeter of the gear 17 is moving about the pinion 16. The purpose of this will be more fully explained hereinafter.

The gear 17 is carried by a shaft 18 that is mounted in suitable bearing standards 19, and said shaft 18 is also provided with a driving pulley 20 through the medium of which continuous motion is imparted to the shaft 18 from any suitable source.

The numeral 21 designates a pair of horizontally-disposed parallel burner tubes, the opposing faces of which are suitably perforated for the exit of the gases that constitute the singeing flames. These tubes 21 are supported at their ends through the medium of brackets 22, and said tubes are connected to a suitable distributing head 23 from which they receive the gaseous fuel. This head 23 is, in turn, fed by a pipe 24, from any suitable source, with an admixture of air and gas, or its equivalent. The tubes 21 are in alinement with the supporting form 6, and the same are spaced sufficiently apart to permit the form 6, charged with an unsinged stocking, to enter therebetween.

To facilitate, however, introduction of the form 6 between the tubes 21 a curved guide-plate 25 is arranged immediately in advance of said burner tubes. In the event of any tendency of the form 6 to sag at its free end the latter will contact with the curved guide 25 and be directed by the latter into the space between the tubes 21. The guide 25 is supported by brackets 26, which brackets are carried by a supplemental supporting frame 27, and this frame also carries the brackets 22 by which the tubes 21 are supported.

Arranged in rear of the burner tubes 21 is a pair of vertically-extending supporting standards 28. The front edges of said standards, or those edges nearest the burner tubes 21, are provided with suitable bearings 29, arranged in superimposed relation, in which bearings is journaled a pair of fiber-removing brushes 30. The bight of these brushes is in line with the space between the burner tubes 21, and the shaft of each brush is provided at one of its ends with a gear 31, said gears intermeshing in order to impart simultaneous rotation to the brushes 30. This rotation is effected through the medium of a driving pulley 32 carried by the shaft of one of said brushes. It will thus be seen that the rotary brushes 30 act upon the stocking carried by the form 6 as the stocking leaves the burner-tubes 21, and said brushes serve to remove the carbonized fiber from the stocking as the latter passes through the bight of the brushes.

Located at the rear edges of the standards 28 are bearings 33, similar to the bearings 29, which bearings 33 receive the shafts of a pair of stripping brushes 34, the shaft of each of the brushes 34 having at one of its ends a gear 35. These gears intermesh, in a manner similar to the gears 31, and thus provide simultaneous rotation for the stripping brushes 34, this rotation being effected by a pulley 36 carried by the shaft of one of said brushes. As the form 6 advances through the fiber-removing brushes 30 the end thereof enters the bight of the rolls 34, and these rolls grip the advancing portion of the stocking in order to remove the latter from the form 6. This gripping of the brushes 34 occurs approximately at the time when the cross head 3 has reached the limit of its movement toward the burner tubes 21, and when movement of the cross head is reversed, the stocking being in the bight of the brushes 34, it is obvious that said cross head acts to withdraw the form 6 from the stocking. Therefore, two forces act upon the stocking to accomplish its removal from the form, to wit: the rotation of the brushes 34, and the reverse movement of the cross head 3. This serves to effectually displace the stocking from the form, and the stocking is discharged by the brushes 34 into any suitable receptacle that may be placed in proximity thereto, or a conveyer might be provided upon which the singed stockings are deposited in order that the stocking might be carried to any suitable point.

In connection with the foregoing it will be noted that the meeting edges of the brushes 30 rotate toward the burner tubes 21, in the brushing action, while the meeting edges of the brushes 34 rotate in a direction opposite to the direction of rotation of the meeting edges of the brushes 30. This is for the obvious reason that were the meeting edges of the brushes 30 to rotate toward the brushes 34 the singed stocking would be removed by said brushes 30 from the form 6, and but a partial brushing thereof would result, while were the meeting edges of the brushes 34 to move toward the brushes 30 no displacement of the singed and brushed stocking from the form 6 would ensue.

In the operation of the hereindescribed machine the normal position of the form 6 is that disclosed in Fig. 1. The cross head 3 is at rest, and this permits an unsinged stocking to be applied to the supporting form 6. As the teeth of the gear 17 come into engagement with the teeth of the pinion 16 the latter commences to rotate, and by reason of the pin and slot connection between the crank 13 and the bar 8 the latter is swung upon its pivot 9. The loose connection of the upper end of the bar 8 with the cross head 3 at the aperture 7 thereof permits the bar 8 to readily slide in said aperture, and as the bar 8 is swung upon its pivot in a forward direction the cross head 3 is caused to advance along the guides 2. The stocking upon the form 6 is thereupon introduced between the burner tubes 21, and as the stocking is advanced therebetween the flames act to singe the loose fibers. During the advancing movement of the form 6, and as the stocking leaves the singeing burners, the stocking is introduced to the action of the brushes 30, which latter serve to remove the carbonized fiber, and after passing these brushes the stocking enters the bight of the brushes 34. These grip the stocking in the manner previously described, and on the reverse movement of the cross head 3, incident to the return of the oscillatory bar 8, the form 6 is withdrawn from the stocking, whereupon the latter continues through the brushes 34 and is discharged from the machine by said brushes. The gear 17 is still in engagement with the pinion 16 until the cross head 3 reaches the limit of its rear movement, or the position shown in Fig. 1, and at this point said cross head comes to rest to enable another unsinged stocking being applied to the form 6. This cycle of operations is repeated, and it is manifest that the speed of the machine may be gaged in order to permit only sufficient dwell of the cross head at its point of rest to enable an unsinged stocking being applied to the form. Thus the machine may be rendered capable of exceedingly quick action, and the operator may become readily experienced in feeding the unsinged stockings to the form 6 in accordance with the speed with which the latter is reciprocated.

It is to be observed that the form 6 is illustrated as supported by a frame separate and distinct from the frame employed for supporting the singeing burners 21, the carbonized fiber-removing brushes 30, and the stripping brushes 34. It is not necessary that these frames should be separate, but merely desirable, and it is perfectly obvious that the parts mentioned may be sustained by a single frame. It is also obvious that in lieu of the brushes 34, pinch-rolls may be substituted therefor, and such rolls will perform the same function of stripping the stockings from the form 6 as is performed by the brushes 34.

In Figs. 5 to 9, inclusive, is disclosed another form of the machine, this form being primarily designed for use where it is desired to automatically feed the unsinged stockings to the form that supports the same during the singeing and brushing actions. Referring to Figs. 5 to 9, the numeral 37 designates the supporting-frame of the machine, and, as previously indicated herein, this frame serves the purpose of supporting all of the elements that make up the stocking supporting means, the singeing means, the fiber-removing means, and the stripping means. A cross-head 38 is mounted to reciprocate upon the frame 37, said cross-head being carried by a pair of parallel guide-rods 39 removably supported in sleeves 40, the rods 39 being held in said sleeves through the medium of set-screws 41. It will thus be seen that the guides for the cross-head 38 are slightly different in construction from the open guides 2 that are employed in the form of machine illustrated in Figs 1 to 4, inclusive. The burner tubes 42; the carbonized fiber-removing brushes 43, and the stripping brushes 44 are similar to the tubes 21; the brushes 30, and the brushes 34, and said brushes 43 and 44 are driven in the same manner as the brushes 30 and 34, pulleys 45 and 46 being employed for this purpose.

A stocking-supporting form 47, similar to the form 6, is carried by a swinging head 48 that is pivoted upon an upwardly-extending stud 49 carried by the cross-head 38, the swinging head 48 being suitably secured upon the cross-head through the medium of a washer 50 and a nut 51. The swinging head 48 is provided with a plurality of gear teeth 52, said teeth being arranged in the form of the segment of a gear, and the same are designed to engage a rack-bar 52 carried by one side of the frame 37, and in proximity to the point at which the cross-head 38 comes to rest when it reaches the limit of its rearward movement. The function of the teeth 52 and the rack-bar 52' is to swing the form 47 to an angle of about 45 degrees to its line of reciprocation, when the cross-head is nearing the limit of its rearward movement, and to return the form 47 to its line of reciprocation on the forward movement of the cross-head 38. When the form 47 has been swung to the side of the machine as described, the same is introduced between a pair of feed-conveyers 53, formed of tufts of bristles, said conveyers being mounted upon suitable rolls 54 and geared together to operate with their contiguous stretches moving in unison toward the cross-head. These conveyers 53 are driven by a pulley 55. The conveyers 53 being fully disclosed in our previous application for patent filed Feb. 13, 1908, Ser. No. 415,689, it is unnecessary to further describe their construction; suffice it to say that said conveyers are supported by a supplemental frame 56 that is arranged at an angle to the frame 37, so that when the form 47 has been swung out of the line of its reciprocation, and thus introduced between the conveyers 53, the latter serve to automatically feed an unsinged stocking to the form 47, and stretch it upon the latter, so that when presented to the burner-tubes 42 the stocking will be free of wrinkles.

For reciprocating the cross-head 38 upon the guides 39 a pitman 57 is pivotally connected to the under side of said cross-head, as at 58, the forward end of said pitman being connected to a crank disk 59 mounted upon a shaft 60 that is journaled in suitable bearings upon the frame 37. The shaft 60 carries a mutilated pinion 61 with which meshes a mutilated gear 62, similar to the gear 17. This gear 62 is carried by a shaft 63 upon which is mounted a driving pulley 64, and through the medium of the latter, the gear 62, and the pinion 61, the cross-head 38 is caused to reciprocate upon the frame 37. In such reciprocation, however, the cross-head 38 has imparted to it a series of periodical dwells in a manner similar to the cross-head 3.

For driving the machine just described, a line shaft 65 is employed having mounted thereon a pulley 66 connected by a belt 67 to the pulley 64. A pulley 68, also carried by the shaft 65, is connected to the pulley 55 of the feed conveyers 53 through the medium of a belt 69, and by means of a pulley 70 that is carried by the shaft 63, and connected by belts 71 and 72, the pulleys 45 and 46 of the fiber-removing brushes 43 and the stripping brushes 44 are driven from said shaft 63.

It is essential that the swinging head 48 shall be limited in its movement when swinging over the arc of its rotation, and be held positively when at each end of such arc of rotation. For this purpose the head 48 is provided with a shoe 73 the side edge of which, when the head 48 is in its normal position, lies in a plane parallel with the line of reciprocation of the cross-head. The shoe 73 engages a longitudinally-extending guide 74 that is carried by one side of the frame 37, and during such engagement it will be seen that the form 47 is held and guided in the reciprocation of the cross-head 38. When, however, said cross-head reaches the limit of its rearward movement, and the teeth 52, by their engagement with the rack 52', swing the form 47 between the feed conveyers 53, the rear end of the shoe 73 is swung into engagement with a deflected flange 75 arranged upon the rear end of the guide 74. This flange 75 limits the outward swinging movement of the form 47, and the teeth 52 and rack-bar 52' firmly hold the form 47 in position between the feed conveyers 53 in order that the stocking may be properly fed thereon. As the form 47 is swung back to its line of reciprocation, the forward end of the shoe 73 contacts with the guide 74, and thus inward movement of the form 47 is limited.

In the operation of the form of the machine illustrated in Figs. 5 to 9, it will be understood that so far as the singeing, the brushing and the stripping of the stockings are concerned, the same correspond to the like actions described in connection with the form illustrated in Figs. 1 to 4. The cross-head 38 is reciprocated in like manner to the cross-head 3, but when the cross-head 38 nears the limit of its rearward movement the teeth 52 engage the rack-bar 52', and the form 47 is thereby swung outwardly and positioned between the feed conveyers 53. The open end of a stocking having been presented by an operative to the bight of these feed conveyers, the latter grip the stocking and feed the stocking along the form 47. This feeding of the stocking takes place during the dwell, or period of rest, of the cross-head 38, incident to the untoothed portion of the gear 62 passing over the untoothed portion of the pinion 61. When, however, the teeth of the gear 62 engage the pinion 61, the cross-head 38 starts its forward movement, and this forward movement of the cross-head causes the form 47 to swing back again to its line of reciprocation, by reason of the engagement of the teeth 52 and the rack bar 52', the forward end of the shoe 73 being brought into contact with the guide 74, and in this forward movement the stocking is singed and brushed, and introduced to the bight of the stripping rolls 44 to be removed from the form 47 in a manner similar to the removal of the stocking from the form 6.

It will, of course, be understood that the form of machine illustrated in Figs. 5 to 9 is also provided with a guide plate 76 similar to the guide plate 25 employed in the form illustrated in Figs. 1 to 4.

The burner tubes, the fiber-removing brushes, and the stripping brushes are arranged in horizontal alinement with the stocking-supporting forms of both forms of the machine, so that said forms move in a rectilinear line in relation to the burner tubes and brushes. Therefore, the movement of the forms in introducing the stockings to the burner tubes and brushes is in a direct line.

Having thus described the invention, what is claimed as new, and desired to be secured by Letters Patent, is:

1. In a machine of the class described, singeing means, a form for supporting the articles to be singed, said form being mounted to reciprocate relatively to the singeing means, and means for actuating said form.

2. In a machine of the class described, singeing means, a form for supporting the articles to be singed, said form being mounted to reciprocate relatively to the singeing means, means for actuating said form, and means for removing the carbonized fiber from the articles.

3. In a machine of the class described, singeing means, a form for supporting the articles to be singed, said form being mounted to reciprocate relatively to the singeing means, means for actuating said form, means for removing the carbonized fiber from the articles, and means for removing the articles from said form.

4. In a machine of the class described, singeing means, means for supporting the articles to be singed, and means for causing relative reciprocatory movement between said singeing means and said supporting means.

5. In a machine of the class described, singeing means, means for supporting the articles to be singed, means for causing relative reciprocatory movement between said singeing means and said supporting means, and means for removing the carbonized fiber from the articles.

6. In a machine of the class described, singeing means, means for supporting the articles to be singed, means for causing relative reciprocatory movement between said singeing means and said supporting means, means for removing the carbonized fiber from the articles, and means for removing the articles from said supporting means.

7. In a machine of the class described, singeing means, means for supporting the articles to be singed, and means for causing relative reciprocatory intermittent movement between said singeing means and said supporting means.

8. In a machine of the class described, singeing means, means for supporting the articles to be singed, means for causing relative reciprocatory intermittent movement between said singeing means and said supporting means, and means for removing the carbonized fiber from the articles.

9. In a machine of the class described, singeing means, means for supporting the articles to be singed, means for causing relative reciprocatory intermittent movement between said singeing means and said supporting means, means for removing the carbonized fiber from the articles, and means for removing the articles from said supporting means.

10. In a machine of the class described, singeing means, means for supporting the articles to be singed, and means for causing relative reciprocatory rectilinear movement between said singeing means and said supporting means.

11. In a machine of the class described, singeing means, means for supporting the articles to be singed, means for causing relative reciprocatory rectiliner movement between said singeing means and said supporting means, and means for removing the carbonized fiber from the articles.

12. In a machine of the class described, singeing means, means for supporting the articles to be singed, means for causing relative reciprocatory rectilinear movement between said singeing means and said supporting means, means for removing the carbonized fiber from the articles, and means for removing the articles from said supporting means.

13. In a machine of the class described, singeing means, means for supporting the articles to be singed in a horizontal plane, and means for causing relative reciprocatory movement between said singeing means and said supporting means.

14. In a machine of the class described, singeing means, means for supporting the articles to be singed in a horizontal plane, means for causing relative reciprocatory movement between said singeing means and said supporting means, and means for removing the carbonized fiber from the articles.

15. In a machine of the class described, singeing means, means for supporting the articles to be singed in a horizontal plane, means for causing relative reciprocatory movement between said singeing means and said supporting means, means for removing the carbonized fiber from the articles, and means for removing the articles from said supporting means.

16. In a machine of the class described, reciprocatory means for supporting the articles to be singed, singeing means, and means for removing the carbonized fiber from the articles, said singeing means and carbonized fiber-removing means being arranged in alinement with said supporting means and acting in the order named upon the articles carried by said supporting means.

17. In a machine of the class described, reciprocatory means for supporting the articles to be singed, singeing means, and means for removing the articles from said supporting means, said singeing means and article-removing means being arranged in alinement with said supporting means and acting in the order named upon the articles carried by said supporting means.

18. In a machine of the class described, reciprocatory means for supporting the articles to be singed, singeing means, means for removing the carbonized fiber from the articles, and means for removing the articles from said supporting means, said singeing means, carbonized fiber-removing means, and article-removing means being arranged in alinement with said supporting means and acting in the order named upon the articles carried by said supporting means.

19. In a machine of the class described, singeing means, a form for supporting the articles to be singed, a cross-head for reciprocating said form relatively to said singeing means, and means for imparting reciprocatory movement to said cross-head.

20. In a machine of the class described, singeing means, a form for supporting the articles to be singed, a cross-head for reciprocating said form relatively to said singeing means, means for imparting reciprocatory movement to said cross-head, and means associated with said singeing means for removing the carbonized fiber from said articles.

21. In a machine of the class described, singeing means, a form for supporting the articles to be singed, a cross-head for reciprocating said form relatively to said singeing means, means for imparting reciprocatory movement to said cross-head, means associated with said singeing means for removing the carbonized fiber from said articles, and means for removing the articles from said form.

22. In a machine of the class described, a pair of burner tubes, a form for supporting the articles to be singed, a cross-head for reciprocating said form relatively to said burner tubes, and means for imparting reciprocatory movement to said cross-head.

23. In a machine of the class described, a pair of burner tubes, a form for supporting the articles to be singed, a cross-head for reciprocating said form relatively to said burner tubes, means for imparting reciprocatory movement to said cross-head, and means associated with said burner tubes for removing the carbonized fiber from said articles.

24. In a machine of the class described, a pair of burner tubes, a form for supporting the articles to be singed, a cross-head for reciprocating said form relatively to said burner tubes, means for imparting reciprocatory movement to said cross-head, means associated with said burner tubes for removing the carbonized fiber from said articles, and means for removing the articles from said form.

25. In a machine of the class described, a pair of burner tubes, a form for supporting the articles to be singed, a cross-head for reciprocating said form relatively to said burner tubes, means for imparting reciprocatory movement to said cross-head, and brushes associated with said burner tubes for removing the carbonized fiber from said articles.

26. In a machine of the class described, a pair of burner tubes, a form for supporting the articles to be singed, a cross-head for reciprocating said form relatively to said burner tubes, means for imparting reciprocatory movement to said cross-head, brushes associated with said burner tubes for removing the carbonized fiber from said articles, and additional brushes for removing the articles from said form.

27. In a machine of the class described, singeing means, means for supporting the articles to be singed, means for causing relative reciprocatory movement between said singeing means and said supporting means, and means for feeding the articles to said supporting means.

28. In a machine of the class described, singeing means, means for supporting the articles to be singed, means for causing relative reciprocatory movement between said singeing means and said supporting means, means for feeding the articles to said supporting means, and means for removing the carbonized fiber from the articles.

29. In a machine of the class described, singeing means, means for supporting the articles to be singed, means for causing relative reciprocatory movement between said singeing means and said supporting means, means for feeding the articles to said supporting means, means for removing the carbonized fiber from the articles, and means for removing the articles from said supporting means.

30. In a machine of the class described, singeing means, means for supporting the articles to be singed, means for causing relative reciprocatory rectilinear movement between said singeing means and said supporting means, means for feeding the articles to said supporting means, and means for moving the supporting means out of and into its path of rectilinear movement to permit the feeding means supplying the supporting means with the articles to be singed.

31. In a machine of the class described, singeing means, means for supporting the articles to be singed, means for causing relative reciprocatory rectilinear movement between said singeing means and said supporting means, means for feeding the articles to said supporting means, means for moving the supporting means out of and into its path of rectilinear movement to permit the feeding means supplying the supporting means with the articles to be singed, and means for removing the carbonized fiber from the articles.

32. In a machine of the class described, singeing means, means for supporting the articles to be singed, means for causing relative reciprocatory rectilinear movement between said singeing means and said supporting means, means for feeding the articles to said supporting means, means for moving the supporting means out of and into its path of rectilinear movement to permit the feeding means supplying the supporting means with the articles to be singed, means for removing the carbonized fiber from the articles, and means for removing the articles from said supporting means.

33. In a machine of the class described, singeing means, means for supporting the articles to be singed, means for causing relative reciprocatory movement between said singeing means and said supporting means, means for imparting periodical dwells to said supporting means during the reciprocation of the latter, and means for feeding the articles to said supporting means during such dwells.

34. In a machine of the class described, singeing means, means for supporting the articles to be singed, means for causing relative reciprocatory movement between said singeing means and said supporting means, means for imparting periodical dwells to said supporting means during the reciprocation of the latter, means for feeding the articles to said supporting means during such dwells, and means for removing the carbonized fiber from the articles.

35. In a machine of the class described, singeing means, means for supporting the articles to be singed, means for causing relative reciprocatory movement between said singeing means and said supporting means, means for imparting periodical dwells to said supporting means during the reciprocation of the latter, means for feeding the articles to said supporting means during such dwells, means for removing the carbonized fiber from the articles, and means for removing the articles from said supporting means.

36. In a machine of the class described, singeing means, means for supporting the articles to be singed, means for causing relative reciprocatory rectilinear movement between said singeing means and said supporting means, means for imparting periodical dwells to said supporting means during the reciprocation of the latter, means for feeding the articles to said supporting means during such dwells, and means for moving the supporting means out of and into its path of rectilinear movement to permit the feeding means supplying the supporting means with the articles to be singed.

37. In a machine of the class described, singeing means, means for supporting the articles to be singed, means for causing relative reciprocatory rectilinear movement between said singeing means and said supporting means, means for imparting periodical dwells to said supporting means during the reciprocation of the latter, means for feeding the articles to said supporting means during such dwells, means for moving the supporting means out of and into its path of rectilinear movement to permit the feeding means supplying the supporting means with the articles to be singed, and means for removing the carbonized fiber from the articles.

38. In a machine of the class described, singeing means, means for supporting the articles to be singed, means for causing relative reciprocatory rectilinear movement between said singeing means and said supporting means, means for imparting periodical dwells to said supporting means during the reciprocation of the latter, means for feeding the articles to said supporting means during such dwells, means for moving the supporting means out of and into its path of rectilinear movement to permit the feeding means supplying the supporting means with the articles to be singed, means for removing the carbonized fiber from the articles, and means for removing the articles from said supporting means.

39. In a machine of the class described, singeing means, a form for supporting the articles to be singed, a cross-head for reciprocating said form relatively to said singeing means, a swinging head carried by said cross-head and to which said form is connected, means for imparting reciprocatory movement to said cross-head, means for feeding the articles to said form, and means for actuating said swinging head to cause the latter to present said form to and remove the same from the feeding means.

40. In a machine of the class described, singeing means, a form for supporting the articles to be singed, a cross-head for reciprocating said form relatively to said singeing means, a swinging head carried by said cross-head and to which said form is connected, means for imparting reciprocatory movement to said cross-head, means for feeding the articles to said form, means for actuating said swinging head to cause the latter to present said form to and remove the same from the feeding means, and means for removing the carbonized fiber from the articles.

41. In a machine of the class described, singeing means, a form for supporting the articles to be singed, a cross-head for reciprocating said form relatively to said singeing means, a swinging head carried by said cross-head and to which said form is connected, means for imparting reciprocatory movement to said cross-head, means for feeding the articles to said form, means for actuating said swinging head to cause the latter to present said form to and remove the same from the feeding means, means for removing the carbonized fiber from the articles, and means for removing the articles from said form.

42. In a machine of the class described, singeing means, a form for supporting the articles to be singed, a cross-head for reciprocating said form relatively to said singeing means, a swinging head carried by said cross head and to which said form is connected, means for imparting reciprocatory movement to said cross-head, means for feeding the articles to said form, means for actuating said swinging head to cause the latter to present said form to and remove the same from the feeding means, and means for limiting movement of the form to and from the feeding means.

43. In a machine of the class described, singeing means, a form for supporting the articles to be singed, a cross-head for reciprocating said form relatively to said singeing means, a swinging head carried by said cross-head and to which said form is connected, means for imparting reciprocatory movement to said cross-head, means for feeding the articles to said form, means for actuating said swinging head to cause the latter to present said form to and remove the same from the feeding means, and means for guiding the form in its reciprocation.

44. In a machine of the class described, singeing means, a form for supporting the articles to be singed, a cross-head for reciprocating said form relatively to said singeing means, a swinging head carried by said cross-head and to which said form is connected, means for imparting reciprocatory movement to said cross-head, means for feeding the articles to said form, means for actuating said swinging head to cause the latter to present said form to and remove the same from the feeding means, and means for limiting movement of the form to and from the feeding means and for guiding the form in its reciprocation.

45. In a machine of the class described, singeing means, a form for supporting the articles to be singed, a cross-head for reciprocating said form relatively to said singeing means, a swinging head carried by said cross-head and to which said form is connected, means for imparting reciprocatory movement to said cross-head, means for feeding the articles to said form, means for actuating said swinging head to cause the latter to present said form to and remove the same from the feeding means, a guide, and a shoe carried by said swinging head and coöperating with said guide for limiting movement of the form to and from the feeding means.

In testimony whereof we affix our signatures, in the presence of two witnesses.

THOMAS ALLSOP.
WALTER. W. SIBSON.

Witnesses:
  ELERY L. SMITH,
  HOWARD MARSHEAD.